(12) United States Patent
Kříž

(10) Patent No.: US 11,030,151 B2
(45) Date of Patent: Jun. 8, 2021

(54) CONSTRUCTING AN INVERTED INDEX

(71) Applicant: Avast Software s.r.o., Prague (CZ)

(72) Inventor: Antonín Kříž, Prachatice (CZ)

(73) Assignee: Avast Software s.r.o., Prague (CZ)

( * ) Notice: Subject to any disclaimer, the term of this patent is extended or adjusted under 35 U.S.C. 154(b) by 103 days.

(21) Appl. No.: 15/940,302

(22) Filed: Mar. 29, 2018

(65) Prior Publication Data

US 2018/0285377 A1     Oct. 4, 2018

Related U.S. Application Data

(60) Provisional application No. 62/478,176, filed on Mar. 29, 2017.

(51) Int. Cl.
   *G06F 16/13*           (2019.01)
   *G06F 16/951*         (2019.01)
   *G06F 16/31*           (2019.01)

(52) U.S. Cl.
CPC ............ *G06F 16/137* (2019.01); *G06F 16/31* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 5,706,365 A * | 1/1998 | Rangarajan | ........ | G06K 9/00469 707/728 |
| 6,259,988 B1 * | 7/2001 | Galkowski | ............. | G01C 21/00 340/989 |
| 2009/0210389 A1 * | 8/2009 | Firestein | ................. | G06F 16/38 |
| 2010/0010989 A1 * | 1/2010 | Li | ......................... | G06F 16/334 707/E17.017 |
| 2014/0047202 A1 * | 2/2014 | Vellore | ............... | G06F 11/1453 711/162 |
| 2014/0164352 A1 * | 6/2014 | Denninghoff | ........ | H03H 9/1092 707/711 |
| 2016/0232143 A1 * | 8/2016 | Fickenscher | .......... | G06F 16/955 |

OTHER PUBLICATIONS

Inverted index, 3 pages, https://web.archive.org/web/20170325025139/https://en.wikipedia.org/wiki/Inverted_index. Accessed Aug. 1, 2018.
MG4J: Managing Gigabytes for Java(TM), 3 pages, https://web.archive.org/web/20170323194507/http://mg4j.di.unimi.it. Accessed Aug. 1, 2018.
Inverted index, 61 pages, https://web.archive.org/web/20171222123940/http://rosettacode.org:80/wiki/Inverted_index. Accessed Aug. 1, 2018.
Tim Ebringer, BINDEX 2.0, Virus Bulletin Conference, Oct. 2011, pp. 191-197.

* cited by examiner

*Primary Examiner* — Mark D Featherstone
*Assistant Examiner* — Samuel C Sharpless, III
(74) *Attorney, Agent, or Firm* — Erickson Kernell IP, LLC; William B. Kircher

(57) ABSTRACT

Systems and methods create an inverted index for a set of documents utilizing a heap data structure. The documents can be divided into a series of n-grams. The n-grams can be hashed, producing hashed n-gram values. A first hashed n-gram value can be placed into the heap data structure. Operations performed using the heap data structure obtain document identifiers that are associated with documents that include a hashed n-gram value that matches the top n-gram value in the heap.

15 Claims, 8 Drawing Sheets

300

```
#this is the main routine
def create_inverted_index( documents ) :
        #create empty heap
        heap = {} fill heap with initial data
        #drawing 1
        for doc in documents :
                #create element from first document hash and document id
                element = doc.hash.first, doc push element into heap
                heap.push( element )

#loop until there are some data in heap
        while not heap.is_empty( ) :
                #get hash and document ids containing the hash
                hash, document_ids = get_next( heap )

#do something with the data, save them to database for example
                process( hash, document_ids )

#this routine returns {hash and array_of_document_ids which contains this hash}
#look into drawing 3
def get_next( heap ) :
        #empty result array
        document_ids = {} get the top hash from heap ( the one with lowest value )
        #this hash will be returned in result
        hash = heap.top( ).hash loop until there are some data in heap
        while not heap.is_empty( ) :
                #get top element from heap
                heap_top = heap.top( );

#if current heap element is NOT hash break the loop
                if heap_top.hash != hash :
                        break insert document id into result
                document_ids.push_back( heap_top.document.id )

#get next hash from document
                record = heap_top.document.read_next_hash( )

#remove top( processed ) element from heap
                heap.pop_top( )

#insert new record into heap if any
                if record :
                        heap.push( record )

#return pair {hash, array_of_document_ids }
        return hash, document_ids
```

FIG. 3

CONSTRUCTING AN INVERTED INDEX

CROSS-REFERENCE TO RELATED APPLICATIONS

This Application claims priority to U.S. Provisional Patent Application Ser. No. 62/478,176, filed on Mar. 29, 2017, entitled "Constructing an Inverted Index," the entire disclosure of which is incorporated herein by reference.

FIELD

The disclosure relates generally to computer systems, and more particularly, to constructing an inverted index from data streams in a computer system.

BACKGROUND

An inverted index is an index that maps content to a document such as a web page or file. For example, search engines typically maintain large inverted indices that map words that may appear in web pages to the web pages. An index of terms at the back of a book is another example of an inverted index. In this case, the inverted index maps a word to its location (i.e., page) in the book. Inverted indexes can be very useful for certain types of processing. However, creation of an inverted index can consume large amounts of processing power and memory storage.

BRIEF DESCRIPTION OF THE DRAWINGS

For a better understanding of the inventive subject matter, reference may be made to the accompanying drawings in which:

FIG. 3 provides example program code for creating an inverted index according to embodiments.

DETAILED DESCRIPTION

Figure 1:
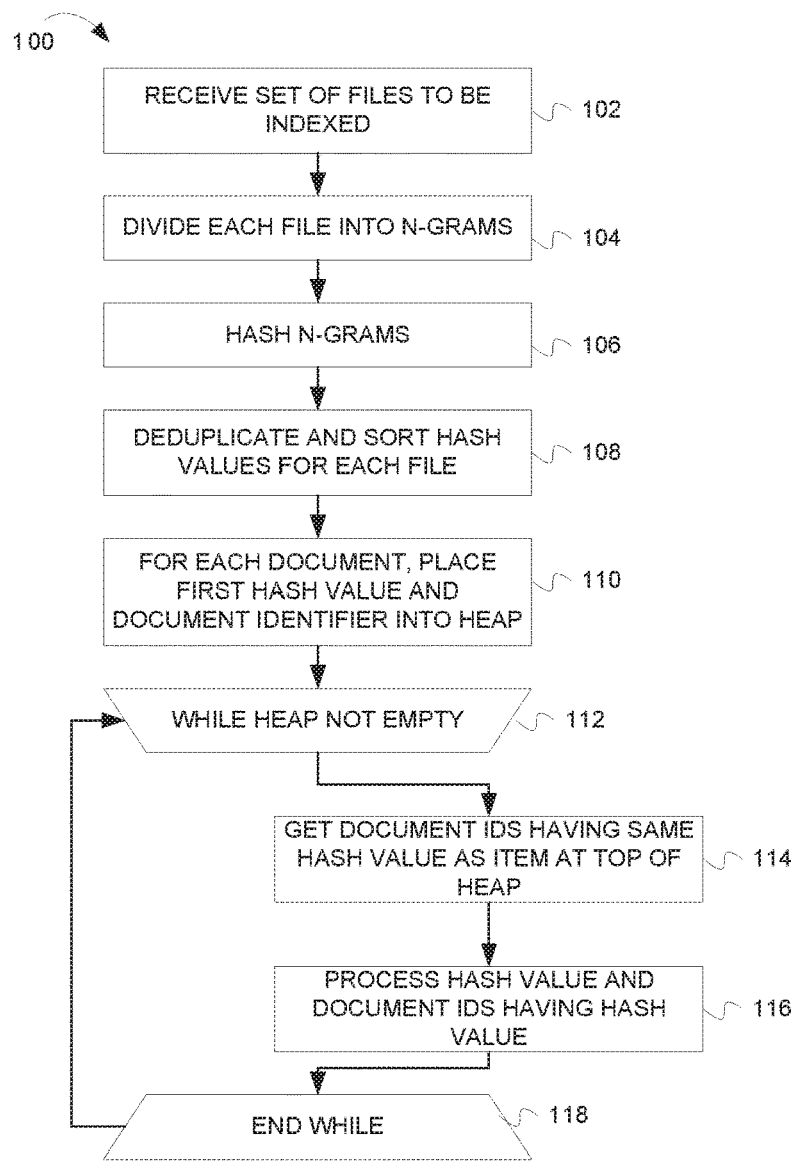
FIG. 1 is a flow chart illustrating operations of a method for creating an inverted index according to embodiments.

In the following detailed description of example embodiments, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a flow chart 100 illustrating operations of a method for creating an inverted index according to embodiments. At block 102, a system creating an inverted index receives a set of documents to be indexed. The documents in the set can be any type of document. For example, the documents in the set can be binary files such as executable files or data files. Alternatively, the documents in the set can be web pages, executable scripts, or any combination of the above. The embodiments are not limited to any particular document type.

At block 104, each of the documents are divided into n-grams. As used herein, an n-gram is a series of n bytes of a document. In some embodiments, n can be four such that an n-gram is a series of four bytes of data from a document. In alternative embodiments, n can be eight, such that an n-gram is a series of eight bytes from a document. It should be noted that the embodiments are not limited to any particular value for n, and in further alternative embodiments, n can be any arbitrarily selected number.

At block 106, the n-grams can be hashed using an algorithm that hashes the n-grams to the same size. In some embodiments, the "xxhash" algorithm is used. However, any hashing algorithm can be used that results in the hashed values having the same size. It should be noted that use of a hashing algorithm is not required in all embodiments. For example, the n-gram could be hashed to itself. The resulting set of hashed n-grams is kept in association with the document that they came from.

At block 108, hashed n-grams for each document can be sorted and deduplicated. In some embodiments, the hashed n-grams can be sorted from the minimum hash value to the maximum hash value. In alternative embodiments, the hash n-grams can be sorted from the maximum hash value to the minimum hash value. The order of the sorting is not important as long as all documents in the set are sorted in the same way.

At block 110, the first hashed n-gram of the sorted hashed n-grams for each document is placed into a heap, along with a document identifier that identifies the document that contained the hashed n-gram. The document identifier can be an ordinal number that uniquely identifies the document. In some embodiments, the document identifier is four bytes long, and the hashed n-gram is also four bytes long. As used herein, a heap can be a tree-based data structure in which a key for a node is ordered with respect to a key for the parent of the node in the same way across all of the nodes in the heap. In some embodiments, the hashed n-gram can be a key. A heap can be classified further as either a "max heap" or a "min heap". In a max heap, the keys of parent nodes are always greater than or equal to those of the children and the highest key is in the root node. In a min heap, the keys of parent nodes are less than or equal to those of the children and the lowest key is in the root node. Items inserted into the heap are placed into the tree representing the heap at a position that satisfies the heap property that the inserted item's parent key (if the inserted node is not at the root) is ordered with respect to the inserted item's key in the same way as all the other nodes in the tree.

Block 112 is the top of a loop that processes items from the heap. The loop will continue to be executed as long as there are items in the heap. Once the heap is empty, the loop is exited. In some embodiments, an item in the heap can be a document identifier along with a hashed n-gram from the document.

At block 114, the method collects document identifiers from the heap that are associated with the same hashed n-gram as the hashed n-gram of the document currently at the top of the heap. The method illustrated in FIG. 2 can be used to obtain such document identifiers.

At block 116, the document identifiers having the same hashed n-gram collected at block 114 can be placed into an inverted index in some embodiments. In alternative embodiments, other processing can be performed in addition to, or instead of placing the document identifiers and associated hashed n-gram into an inverted index.

Block 118 is the bottom of the loop that processes the heap. If items remain in the heap, the method returns to block 112 to process the new currently top item in the heap.

Figure 2:
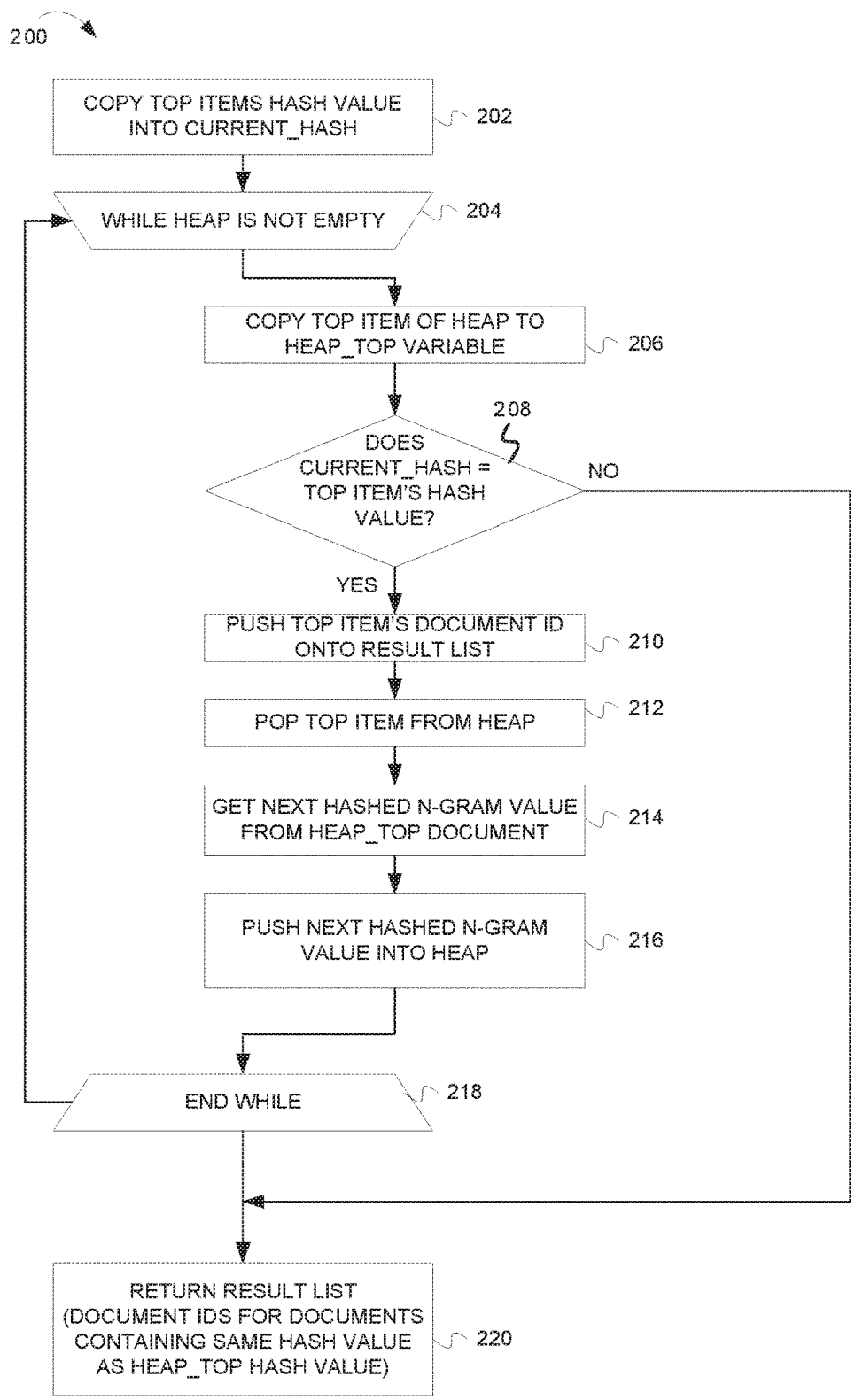
FIG. 2 is a flow chart illustrating further details of operations of a method for creating an inverted index according to embodiments.

FIG. 2 is a flow chart illustrating further details of operations of a method for creating an inverted index according to embodiments. In particular, FIG. 2 illustrates a method for obtaining document identifiers from a heap that have a same hashed n-gram value as the current top item in the heap.

At block 202, the hashed n-gram value of the top item in the heap is copied to a variable, referred to herein as "CURRENT_HASH."

Block 204 is the top of a loop that is executed as long as the heap is not empty (or exited as indicated below).

At block 206, the current top item from the heap (i.e., the document identifier and hashed n-gram value) are stored (i.e., copied) to a variable referred to herein as "HEAP_TOP."

At decision block 208, a check is made to determine if the CURRENT_HASH n-gram value is the same as the hashed n-gram value of the current top item of the heap. If the hashed n-gram values are not the same, then the method proceeds to block 220 and the loop is exited.

If the CURRENT_HASH n-gram value is the same as the hashed n-gram value of the item currently at the top of the heap, then the method proceeds to block 210.

At block 210, the document identifier of the current top item of the heap is placed into the result list.

At block 212, the current top item has been processed and is popped (i.e., removed) from the heap.

At block 214, the next hashed n-gram value is obtained from the document identified by the HEAP_TOP document identifier.

At block 216, the next hashed n-gram value obtained at block 214 is pushed into the heap along with the document identifier. The operations at blocks 214 and 216 keep the heap populated with items.

Block 218 is the end of the while loop. If items remain in the heap, the method proceeds to block 204 to process the next item in the heap. If no items remain in the heap, then the method proceeds to block 220.

Block 220 is reached in two cases, from block 218 when the heap is empty, or from block 208 when the currently top items hashed n-gram value does not match the hashed n-gram value saved in the CURRENT_HASH variable. At this point, the method returns a result list that comprises a list of document identifiers that have a hashed n-gram value that matches the hashed n-gram value that was at the top of the heap when the method was invoked and saved as CURRENT_HASH.

It is noted that the methods illustrated in FIG. 1 and FIG. 2 interact with the same heap. That is, the method in FIG. 2 pushes and pops items from the heap, and the method in FIG. 1 includes a check to determine if the heap is empty. Both methods are interacting with the same heap.

FIG. 3 provides an example program code section 300 for creating an inverted index according to embodiments. The example program code section 300 is written in the style of a Python-like programming language understandable to those of skill in the art. Two routines, "create_inverted_index" and "get_next" are defined in the example program code section 300. The routine "create_inverted_index" generally corresponds to the method illustrated in FIG. 2. The routine "get_next" generally corresponds to the method illustrated in FIG. 2.

Figure 4:
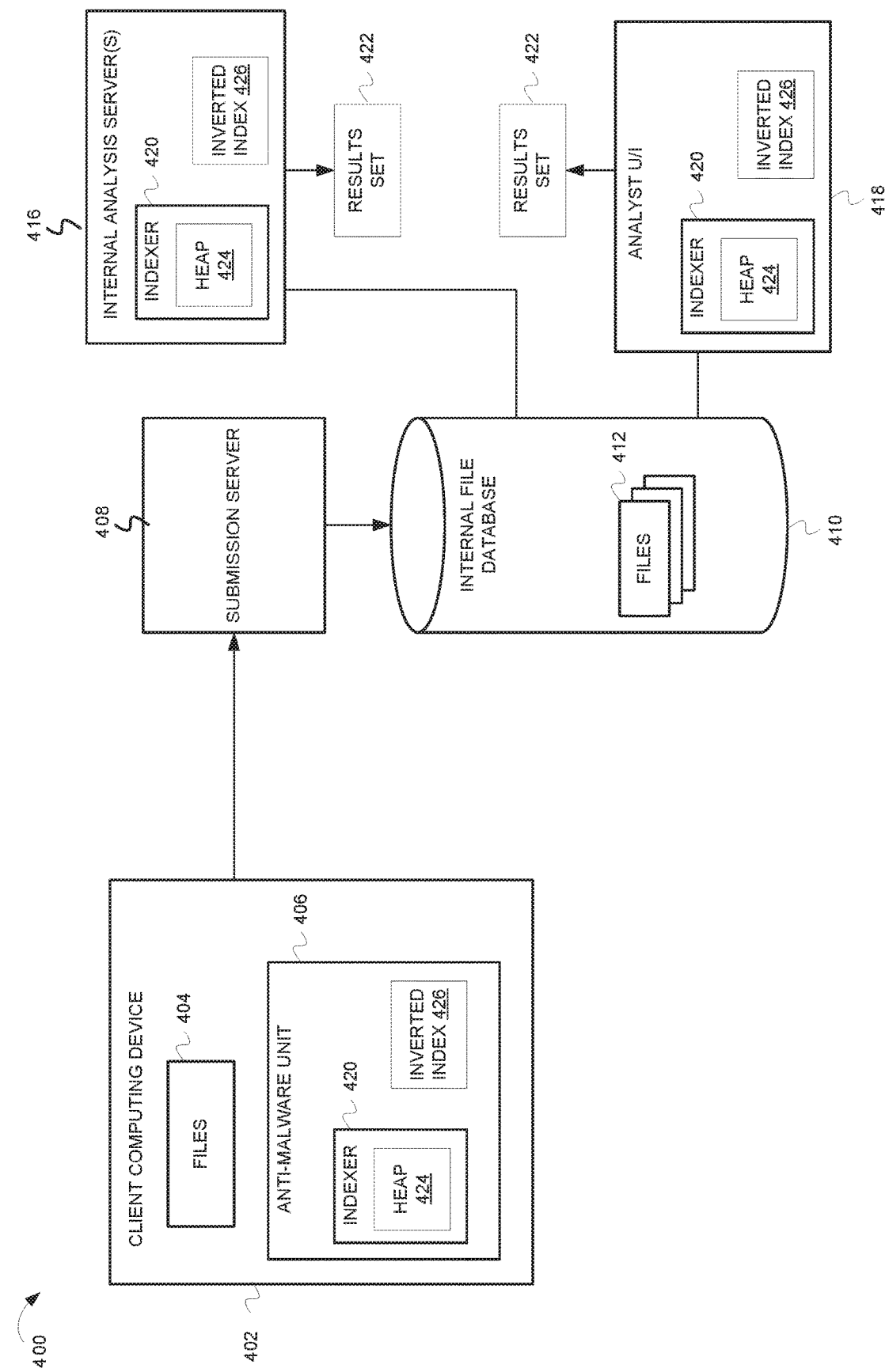
FIG. 4 is a block diagram illustrating an example system utilizing an inverted index according to embodiments.

FIG. 4 is a block diagram illustrating various components of an example system 400 that can create and utilize an inverted index according to embodiments. In some embodiments, system 400 includes client computing device 402, submission server 408, internal file database 410, internal analysis server 416, and an analyst user interface (U/I) 418.

Client computing device 402 can be a desktop computer, laptop computer, tablet computer, smart phone, personal digital assistant, media player, set top box, or any other device having one or more processors and memory for executing computer programs. The embodiments are not limited to any particular type of computing device. Client computing device 402 can include an anti-malware unit 406. Anti-malware unit 406 can include one or more of software, firmware or other programmable logic that can detect malicious files. Additionally, anti-malware unit 406 can submit new files 404 for analysis. Anti-malware unit 406 can include an indexer 420 that generates an inverted index 426 using heap 424 as described above in FIGS. 1-3. The anti-malware unit can use the inverted index to analyze the files to determine if the files 404 contain malware, or are suspected of containing malware. In response to determining that the files contain malware, the anti-malware unit can alert the user, quarantine the files 404, and/or remove the malware from the files 404.

In response to determining that the files 404 are suspected of containing malware, client computing device 402 can submit files 404 to submission server 408. Submission server 408 can perform preprocessing on the new files 404 and add the new file to a collection of files 412.

Analyst U/I 418 can provide a user interface for an analyst to access tools that can be used to determine if a file contains malware. The analyst U/I 418 may include an indexer 420 that creates an inverted index 426 using a heap 424 as described above with respect to FIGS. 1-3. The resulting inverted index can be used to compare files associated with known malware, or known clean files to aid in determining if any of a set of files contains malware.

Internal analysis servers 416 can perform static or dynamic analysis of a file for internal database 410. In some aspects, an internal analysis application can perform a static analysis of a file. Internal analysis server 416 can include an indexer 420 that can create an inverted index 426 using a heap 424 as described above with respect to FIGS. 1-3. The generated inverted index can be used to compared to files associated with known malware, or known clean files to aid in determining if a file contains malware.

The analyst U/I 418 and/or the internal analysis server 416 can produce a results set 422. For example, a results set 422 can comprise the files that have a same hashed n-gram. The results set can be generated using inverted index 426.

While the above discussion has been presented in the context of malware detection, those of skill in the art having the benefit of the disclosure will appreciate that the inverted index can be useful in other binary file search, comparison or clustering environments. Use of the disclosed methods of creating an inverted index in these environments is within the scope of the inventive subject matter.

Figure 5:
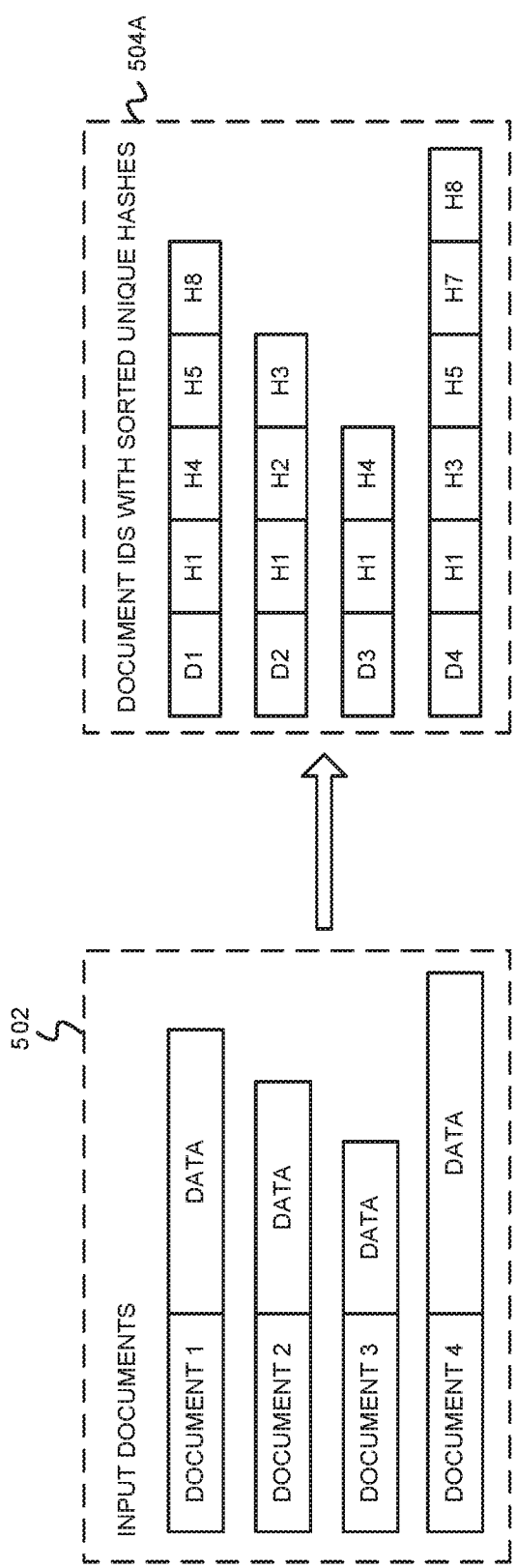
FIGS. 5-7 are block diagrams illustrating example operations of creating an inverted index according to embodiments.
Figure 6:
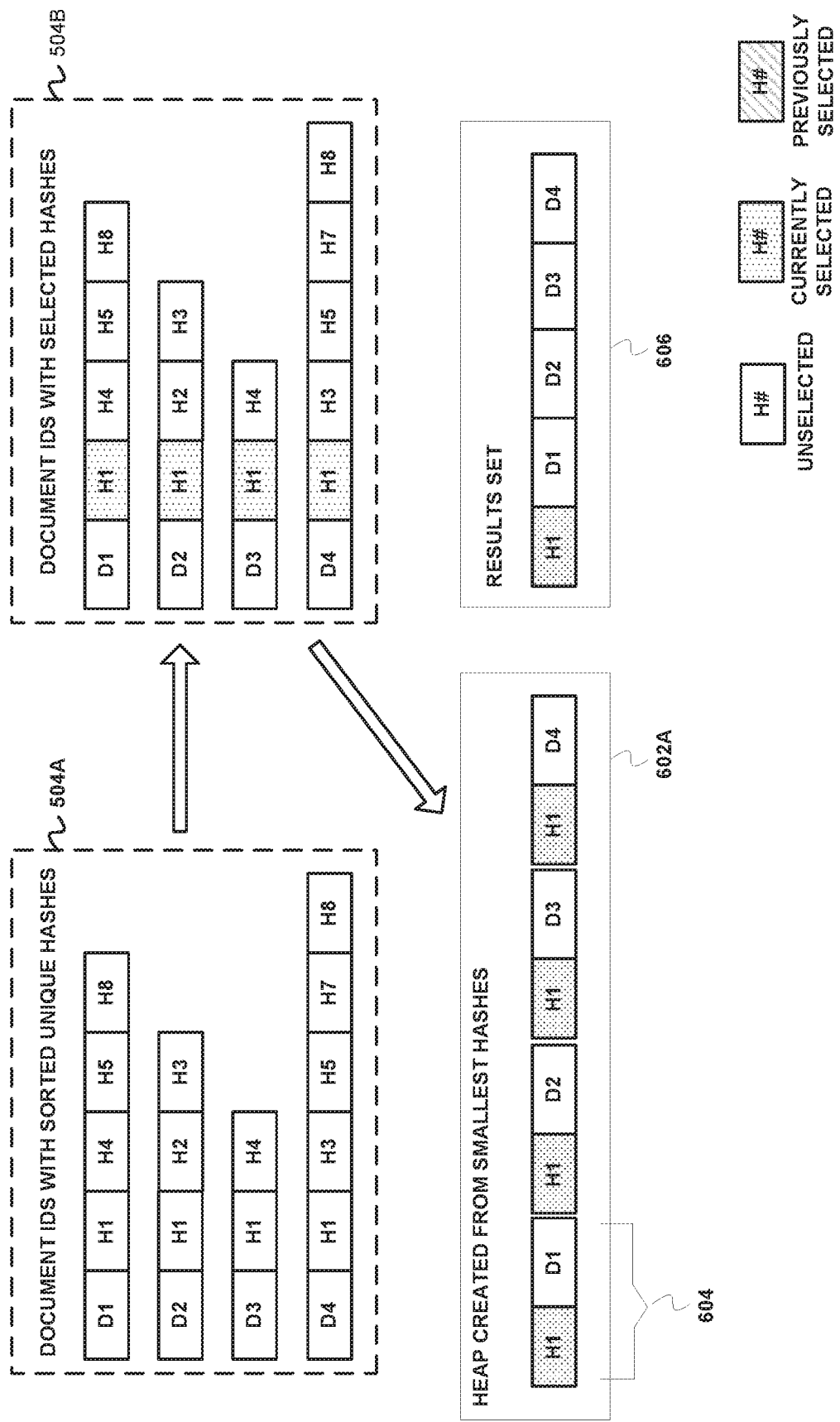
Figure 7:
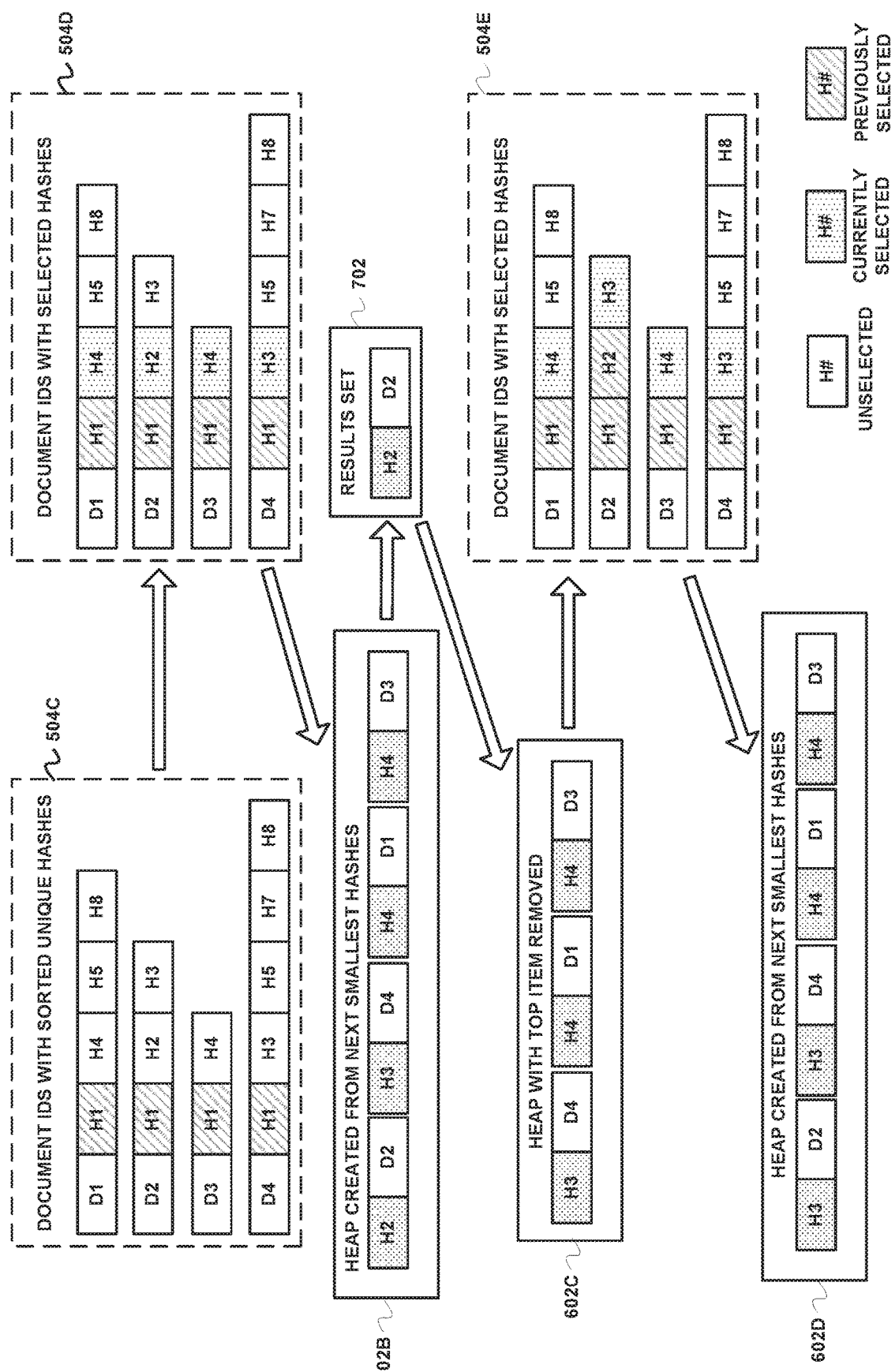

FIGS. 5-7 are block diagrams illustrating example operations of creating an inverted index according to embodiments.

FIG. 5 is a block diagram providing an example illustrating the initial operations of the method illustrated in FIG. 1. In particular, FIG. 5 illustrates the operations at blocks 102-108 of the method. In the example of FIG. 5, a set of four input documents 502, labeled document 1, document 2, document 3 and document 4 is to be processed. As shown in FIG. 5, the example documents have differing amounts of data illustrated by the different lengths of the "data" field. A sorted set of hashed n-gram values 504A is also illustrated in FIG. 5. The sorted set 504A is produced by dividing the input documents into n-grams, and hashing the n-grams as discussed above with respect to operations of blocks 104-108 of FIG. 1. Thus, document 1 has a document identifier "D1", document 2 has a document identifier "D2", document 3 has a document identifier "D3", and document 4 has a document identifier "D4". As discussed above, each of D1, D2, D3 and D4 can be an ordinal number uniquely identifying a respective document 1-4. The labels H1-H8 represent the sorted hashed n-gram values associated with a document, where H1<H2<H3<H4<H5<H6<H7<H8. For example, document D1 has four hashed n-grams, H1, H4, H5 and H8. The other documents have the hashed n-grams indicated with the respective document identifiers.

FIG. 6 is a block diagram that continues the example shown in FIG. 5, and illustrates operations 110 and 114 of the method of FIG. 1. The selection of the first hashed n-gram from each document in sorted set of hashed n-grams 504A is shown in the sorted set of hashed n-grams 504B, where the selected hashed n-grams are highlighted. As shown in FIG. 6, each document includes the hashed n-gram value H1. Heap 602A illustrates the additional four items 604, the top hashed n-gram of each document along with its associated document identifier. The results set 606 represents the first iteration of operations 114. Results set 606 indicates that documents D1-D4 each include the hashed n-gram H1.

FIG. 7 is a block diagram that continues the examples started in FIGS. 5 and 6. FIG. 7 illustrates further iterations of operation 114 of FIG. 1, and the operations of FIG. 2. The highlighted entries in sorted set of hashed n-grams 504C represent entries that have already been processed in a previous iteration of the loop. The sorted set of hashed n-grams 504D includes additional highlighted entries H4, H2, H4 and H3 of documents D1-D4 respectively that are now the next hashed n-grams to be processed. The highlighted entries are placed in the heap 602B, and are sorted as indicated using the sorted tree properties of the heap. Thus, hashed n-gram H2 is the first to be processed in the heap 602B. Only one document, D2 includes this hashed n-gram. Thus, the result set 702 only includes the H2-D2 pair. The H2-D2 item is popped from the heap, and in a next iteration of the loop, hashed n-gram H3 is at the top of the heap as shown in heap 602C. The sorted set of hashed n-grams 504E has highlighting to indicate the previously processed hashed n-grams and the current hashed n-grams for each document. Heap 602D shows the heap with the next smallest hashes from the sorted set of hashed n-grams 504E.

The examples illustrated in FIGS. 5-7 show a relatively small number of files and small number of hashed n-grams in order to provide an understandable example of the systems and methods disclosed herein. Those of skill in the art having the benefit of the disclosure will appreciate that the number of files and associated hashed n-grams will typically be much larger.

Various embodiments can provide distinct advantages over conventional methods of inverted index creation in terms of memory consumed and processor resources.

For example, the heap in some embodiments is at most as big as the number of documents. For example, if there are N documents, the heap has up to N elements all the time. This is an improvement over conventional methods, which can require memory that is proportional to the number of hashes in the documents (which typically is of a greater magnitude). For example, conventional methods use tree-like structures that are constructed from the whole data. As a result, they need to store N*H entries, which can result in enormous memory requirements.

Additionally, the methods of the various embodiments can provide improved efficiency and faster execution when compared to previous methods. The "Big O" notation is used in Computer Science to describe the performance or complexity of an algorithm. The complexity of the methods disclosed herein can result in a Big O complexity of $H*\log 2(N)$, where H is total number of all hashes from all documents and N is number of documents. The "H*" factor indicates that each hashed n-gram is processed only once, and the "log 2(N)" factor represents overhead due to heap pop/push.

Thus, in some embodiments, the size of the documents is not an important factor in overall memory and processing resources. Instead, the number of documents is more significant. This is because in many cases in which an inverted index used, there may be a relatively small number of documents (N) but they are very large number of hashed n-grams (H). For example, in some environments, there can be about 1000-10,000 files, but H can be anywhere from 1,000,000-1,000,000,000.

Various embodiments can include other optimizations. For example, some embodiments use a four bytes integer long hash and a four bytes integer long document identifier. The hash and document identifier can be combined into one eight byte integer. As a result, the hash and document id can be compared at the same time. Additionally, the set of document identifiers in the result is always sorted which can be useful for later processing of the results.

Additionally, the maximal size of the heap can be determined ahead of time. This allows a binary heap to be implemented in a fixed sized array. Because the size of the heap can be constant during the whole indexing process so there is no need to allocate any additional memory. As a result, the systems and methods can be referred to as streaming, because they are amenable to being applied to streaming data.

Figure 8:
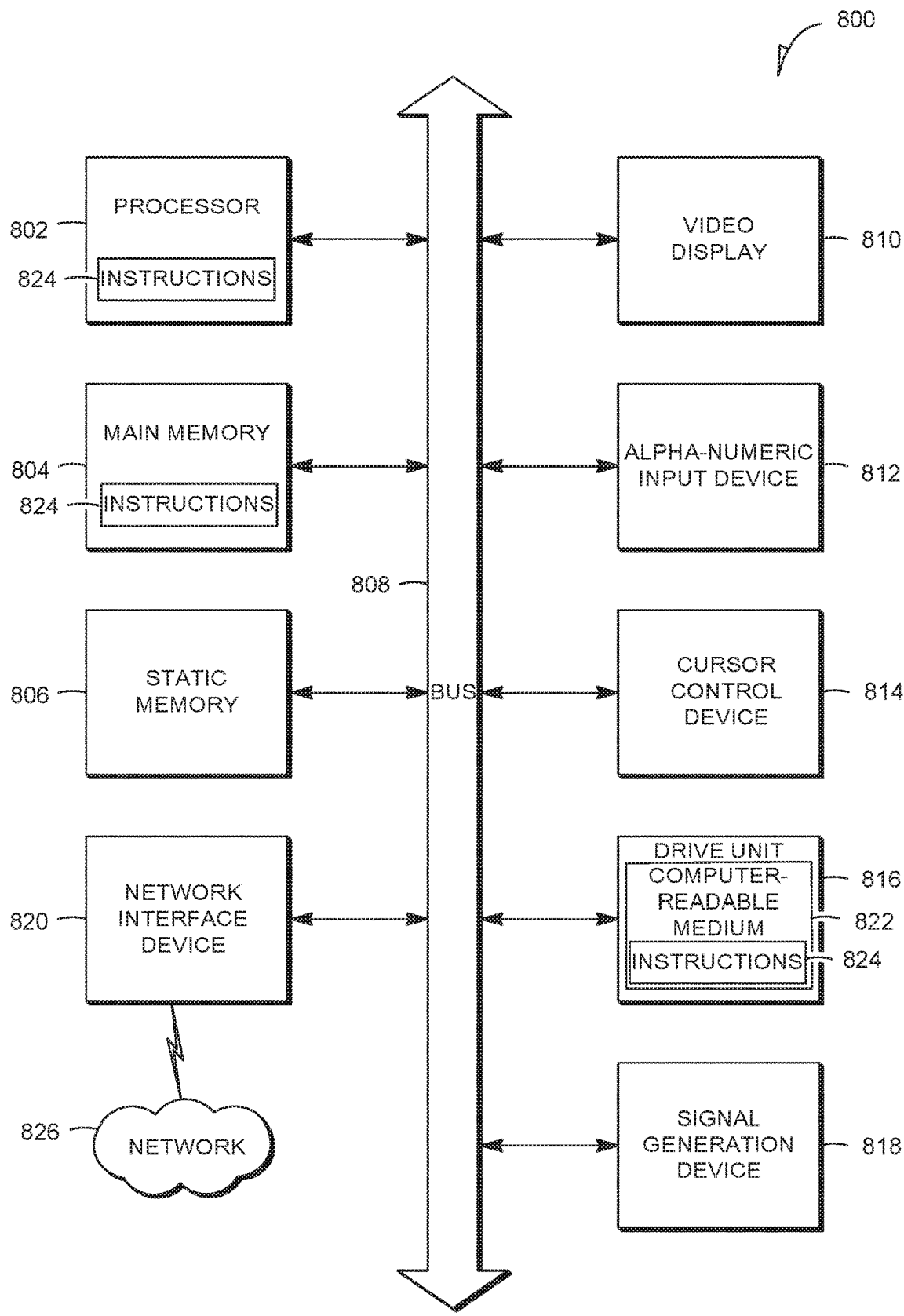
FIG. 8 is a block diagram of an example embodiment of a computer system upon which embodiments of the inventive subject matter can execute.

FIG. 8 is a block diagram of an example embodiment of a computer system 800 upon which embodiments of the inventive subject matter can execute. The description of FIG. 8 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 8 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 824 may further be transmitted or received over a communications network 826 using a signal transmission medium via the network interface device 820 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter.

What is claimed is:

1. A method for creating an inverted index, the method comprising:
  receiving a plurality of documents to be indexed;
  dividing each of the plurality of documents into a plurality of n-grams, wherein an n-gram comprises a series of n bytes from the document;
  hashing each n-gram of the plurality of n-grams to produce a plurality of hashed n-gram values;
  for each document of the plurality of documents, placing the plurality of hashed n-gram values of the document and a document identifier associated with the document into a heap data structure, wherein the heap data structure is a tree-based data structure in which a key for a node is ordered with respect to a key for a parent of the node in the same way across all of the nodes in the heap; and
  while the heap data structure is not empty, performing first operations comprising:
    obtaining a first top hashed n-gram value from the heap data structure,
  obtaining from the heap data structure the document identifier of every document of the plurality of documents having at least one hashed n-gram value that is the same as the first top hashed n-gram value, wherein obtaining from the heap data structure the document identifier comprises:
    saving a copy of a second top hashed n-gram value; and
    while the heap data structure is not empty, performing second operations comprising:
      determining whether a third top hashed n-gram value matches the copy of the second top hashed n-gram value,
      in response to determining that the third top hashed n-gram value does not match the copy of the second top hashed n-gram value, returning a results list,
      in response to determining that the third top hashed n-gram value matches the copy of the second top hashed n-gram value, performing operations comprising:
        inserting a document identifier associated with the third top hashed n-gram value into the results list, and
        popping the third top hashed n-gram value from the heap, and
  placing the obtained document identifiers into an inverted index in association with the first top hashed n-gram value.

2. The method of claim 1, wherein the second operations further comprise:
  saving a copy of a current top item of the heap;
  getting a next hashed n-gram value from a document associated with the copy of the current top item of the heap; and
  pushing the next hashed n-gram value into the heap.

3. The method of claim 1, further comprising sorting and deduplicating the hashed n-gram values associated with each of the plurality of documents.

4. The method of claim 1, wherein the plurality of documents includes at least one binary file.

5. The method of claim 1, wherein the heap data structure is a max heap data structure.

6. A non-transitory machine-readable medium having instructions stored thereon, the instructions comprising computer executable instructions that when executed, cause one or more processors to:
  receive a plurality of documents to be indexed;
  divide each of the plurality of documents into a plurality of n-grams, wherein an n-gram comprises a series of n bytes from the document;
  hash each n-gram of the plurality of n-grams to produce a plurality of hashed n-gram values;
  for each document of the plurality of documents, place the plurality of hashed n-gram values of the document and a document identifier associated with the document into a heap data structure, wherein the heap data structure is a tree-based data structure in which a key for a node is ordered with respect to a key for a parent of the node in the same way across all of the nodes in the heap; and
  while the heap data structure is not empty, perform first operations comprising:
    obtain a first top hashed n-gram value from the heap data structure,
    obtain from the heap data structure the document identifier of every document of the plurality of documents having at least one hashed n-gram value that is the same as the first top hashed n-gram value, wherein obtain from the heap data structure the document identifier comprises:
      save a copy of a second top hashed n-gram value; and
      while the heap data structure is not empty, perform second operations comprising:
        determine whether a third top hashed n-gram value matches the copy of the second top hashed n-gram value,
        in response to a determination that the third top hashed n-gram value does not match the copy of the second top hashed n-gram value, return a results list,
        in response to a determination that the third top hashed n-gram value matches the copy of the second top hashed n-gram value, perform operations comprising:
          insert a document identifier associated with the third top hashed n-gram value into the results list, and
          pop the third top hashed n-gram value from the heap, and
    place the obtained document identifiers into an inverted index in association with the first top hashed n-gram value.

7. The non-transitory machine-readable medium of claim 6, wherein the second operations further comprise:
  save a copy of a current top item of the heap;
  get a next hashed n-gram value from a document associated with the copy of the current top item of the heap; and
  push the next hashed n-gram value into the heap.

8. The non-transitory machine-readable medium of claim 6, wherein the computer executable instructions further comprise instructions to sort and deduplicate the hashed n-gram values associated with each of the plurality of documents.

9. The non-transitory machine-readable medium of claim 6, wherein the plurality of documents include at least one binary file.

10. The non-transitory machine-readable medium of claim 6, wherein the heap data structure is a max heap data structure.

11. An apparatus comprising:
one or more processors; and
a non-transitory machine-readable medium having computer executable instructions stored thereon, that when executed, cause the one or more processors to:
receive a plurality of documents to be indexed;
divide each of the plurality of documents into a plurality of n-grams, wherein an n-gram comprises a series of n bytes from the document;
hash each n-gram of the plurality of n-grams to produce a plurality of hashed n-gram values;
for each document of the plurality of documents, place the plurality of hashed n-gram values of the document and a document identifier associated with the document into a heap data structure, wherein the heap data structure is a tree-based data structure in which a key for a node is ordered with respect to a key for a parent of the node in the same way across all of the nodes in the heap; and
while the heap data structure is not empty, perform first operations comprising:
obtain a first top hashed n-gram value from the heap data structure,
obtain from the heap data structure the document identifier of every document of the plurality of documents having at least one hashed n-gram value that is the same as the first top hashed n-gram value, wherein obtain from the heap data structure the document identifier comprises:
save a copy of a second top hashed n-gram value; and
while the heap data structure is not empty, perform second operations comprising:
determine whether a third top hashed n-gram value matches the copy of the second top hashed n-gram value,
in response to a determination that the third top hashed n-gram value does not match the copy of the second top hashed n-gram value, return a results list,
in response to a determination that the third top hashed n-gram value matches the copy of the second top hashed n-gram value, perform operations comprising:
insert a document identifier associated with the third top hashed n-gram value into the results list, and
pop the third top hashed n-gram value from the heap, and place the obtained document identifiers into an inverted index in association with the first top hashed n-gram value.

12. The apparatus of claim 11, wherein the second operations further comprise:
save a copy of a current top item of the heap;
get a next hashed n-gram value from a document associated with the copy of the current top item of the heap; and
push the next hashed n-gram value into the heap.

13. The apparatus of claim 11, wherein the computer executable instructions further comprise instructions to sort and deduplicate the hashed n-gram values associated with each of the plurality of documents.

14. The apparatus of claim 11, wherein the plurality of documents includes at least one binary file.

15. The apparatus of claim 11, wherein the heap data structure is a max heap data structure.

* * * * *